Aug. 21, 1923.
A. RICHTER
WELL CASING PIPE
Filed April 8, 1922
1,465,484
FIG_1_
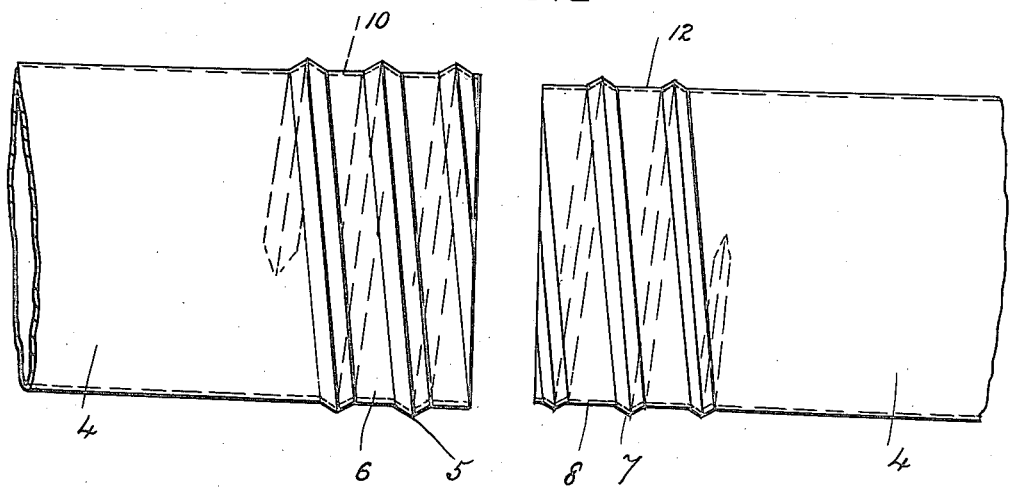
FIG_2_
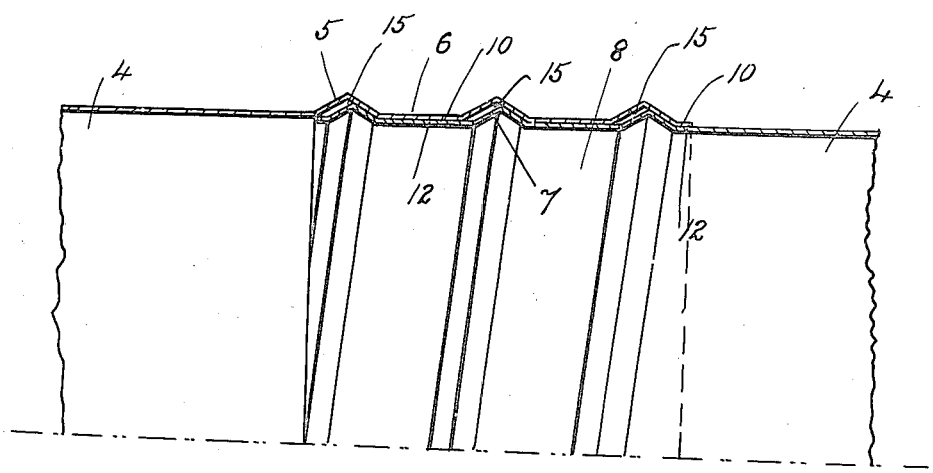
Inventor.
Alexander Richter,
by Herbert W. Jenner,
Attorney.

Patented Aug. 21, 1923.

1,465,484

UNITED STATES PATENT OFFICE.

ALEXANDER RICHTER, OF HOLYROOD, KANSAS.

WELL-CASING PIPE.

Application filed April 8, 1922. Serial No. 550,812.

*To all whom it may concern:*

Be it known that I, ALEXANDER RICHTER, a citizen of the United States, residing at Holyrood, in the county of Ellsworth and State of Kansas, have invented certain new and useful Improvements in Well-Casing Pipes, of which the following is a specification.

This invention relates to pipes formed of thin sheet metal and used as well casings, well tubing and conductor pipes; and it consists in forming the screw threads which connect the pipe sections as hereinafter fully described and claimed, so that the pipe sections can be screwed together and unscrewed with great facility, and so that they will not slip or pull apart.

In the drawings, Figure 1 is a side view of the end portions of two pipe sections provided with screw threads according to this invention. Fig. 2 is a longitudinal section through the meeting end portions of two pipe sections showing them screwed together, and drawn to a larger scale.

Sheet metal pipes for well casings, and for other purposes, are usually provided with angular screw threads at their end portions, which are pressed up in the metal, and each section of pipe is made slightly tapering, and the screw threads on each end are of substantially the same size, being made by the same appliance for that purpose. Such pipe sections require wrenches or other similar appliances for screwing them together and for unscrewing them when the screw threads fit snugly, and when the screw threads do not fit snugly they work loose and the pipe sections pull apart. Such pipe sections are formed from flat plates bent to tubular form with overlapping edges which are secured together by rivets.

According to the present invention each pipe section 4 is formed of sheet metal of the usual relative diameter, thickness, length and taper, but the screw thread 5 pressed on the larger end portion 6 of each pipe section is wider and deeper than the corresponding screw thread 7 on the smaller end portion 8 of the pipe section. The peripheral portion 10 between the screw threads of the larger end portion 6 is formed so that it bears on the corresponding portion 12 of the smaller end portion 8.

When the meeting end portions of the two pipe sections are screwed together, as shown in Fig. 2, the parts 10 and 12 are in contact, and one side of each screw thread bears against the adjacent side of the other screw thread, leaving a space 15 between the other sides of the screw threads. The peripheral surfaces 10 and 12 between the bottoms of the screw threads are wider than the screw threads, and these surfaces preserve the alinement of the pipe sections. The contact of the adjacent surfaces on one side only of the screw threads makes the joint substantially water-tight or oil-tight.

When the pipe sections are constructed in this manner they can be screwed together and unscrewed by hand without the aid of wrenches or other tools, and they form a satisfactory joint which does not work loose or slip. The screw threads assume the position shown in Fig. 2 when the pipe sections are screwed together to their full extent.

What I claim is:

1. A pipe formed of similar sheet metal sections having similarly-projecting angular screw threads pressed up on their end portions and adapted to connect them together, said sections having, between the bottoms of their screw threads, peripheral portions which are in contact, and the screw thread on one section being wider and deeper than the screw thread on the section with which it engages, said screw threads being in contact on one side only when the sections are screwed up and extending to the ends of the pipes to permit them to be screwed and unscrewed.

2. A pipe formed of similar tapering sheet metal sections having similar outwardly-projecting angular screw threads pressed up on their tapering end portions and adapted to connect them together, said sections having, between the bottoms of their screw threads, peripheral portions which are in contact, and the screw thread of the outer section being wider and deeper than the screw thread on the inner section with which it engages and engaging with it upon one side only when the sections are screwed up and extending to the ends of the pipes to permit them to be screwed and unscrewed.

In testimony whereof I have affixed my signature.

ALEXANDER RICHTER.